United States Patent
Toda

(10) Patent No.: US 6,791,644 B2
(45) Date of Patent: Sep. 14, 2004

(54) REFLECTIVE LIQUID-CRYSTAL DISPLAY

(76) Inventor: Kohji Toda, 1-49-18 Futaba, Yokosuka 239-0814 (JP)

( * ) Notice: Subject to any disclaimer, the term of this patent is extended or adjusted under 35 U.S.C. 154(b) by 60 days.

(21) Appl. No.: 10/350,949

(22) Filed: Jan. 22, 2003

(65) Prior Publication Data

US 2004/0141111 A1 Jul. 22, 2004

(51) Int. Cl.[7] .............................................. G02F 1/1335
(52) U.S. Cl. ........................................ 349/114; 349/113
(58) Field of Search ................................ 349/113, 114, 349/141, 172, 123

(56) References Cited

U.S. PATENT DOCUMENTS 5,146,355 A * 9/1992 Prince et al. .................. 349/71
6,671,030 B2 * 12/2003 Gyoda ......................... 349/190
6,690,448 B2 * 2/2004 Kawase et al. .............. 349/187

* cited by examiner

Primary Examiner—Toan Ton

(57) ABSTRACT

A reflective liquid-crystal display comprises a display assembly and a piezoelectric assembly, on which the display assembly is formed. The display assembly is composed of first- and second transparent nonpiezoelectric-plates having first- and second transparent electrodes, respectively, and a liquid crystal between thereof. The piezoelectric assembly is composed of a piezoelectric substrate, at least one electrode under the piezoelectric substrate, and a counter electrode over the piezoelectric substrate. If a first electric signal is applied to the piezoelectric assembly, a transition from a transparent- to an opaque state in the liquid crystal occurs. In this time, if a second electric signal is applied to a part of the liquid crystal, a transition from the opaque- to the transparent state in the liquid crystal occurs. Thus, a light through the part of the liquid crystal is reflected at the counter electrode.

19 Claims, 20 Drawing Sheets subelectrode

REFLECTIVE LIQUID-CRYSTAL DISPLAY

BACKGROUND OF THE INVENTION

1. Field of the Invention

The present invention relates to a reflective liquid-crystal display by means of using a display assembly and a piezoelectric assembly formed under the display assembly. The display assembly is composed of a first transparent nonpiezoelectric-plate having a first transparent electrode under thereof, a second transparent nonpiezoelectric-plate having a second transparent electrode over thereof, and a liquid crystal between the first- and second transparent electrodes. The piezoelectric assembly is composed of a piezoelectric substrate, at least one electrode under the piezoelectric substrate, and a counter electrode over the piezoelectric substrate.

2. Description of the Prior Art

The thin-film transistor (TFT)-type liquid-crystal display is a popular one of conventional liquid-crystal displays, and belongs to nonreflection-type displays. It is good in quality, however has a large problem on electric power consumption, because it needs a backlight. The electric power consumption to the backlight is approximately 80% of all the electric power consumption to the display. In addition, it needs polarizers, so that has a large dimension in thickness. On the other hand, reflection-type displays, for example, polymer dispersed display and guest-host mode display, are superior in electric power consumption to the nonreflection-type displays, however, have a large problem on brightness. In addition, the reflection-type displays have problems on contrast ratio, range of vision, accuracy, clearness, response time, durability, manufacturing, inferiority in liquid crystal, and device size.

SUMMARY OF THE INVENTION

An object of the present invention is to provide a reflective liquid-crystal display excellent in brightness and contrast ratio.

Another object of the present invention is to provide a reflective liquid-crystal display operating under low electric power consumption.

Another object of the present invention is to provide a reflective liquid-crystal display with high accuracy and clearness.

Another object of the present invention is to provide a reflective liquid-crystal display operating with a quick response time.

Another object of the present invention is to provide a reflective liquid-crystal display excellent in durability and manufacturing.

Another object of the present invention is to provide a reflective liquid-crystal display without the inferiority in liquid crystal.

Another object of the present invention is to provide a reflective liquid-crystal display without a backlight behind the display.

Another object of the present invention is to provide a reflective liquid-crystal display without polarizers.

Another object of the present invention is to provide a reflective liquid-crystal display excellent in flexibility, that is, capable of, not flat, but curved display.

A still other object of the present invention is to provide a reflective liquid-crystal display having a small size in layer thickness and a simple structure which is very light in weight.

A still further object of the present invention is to provide a reflective liquid-crystal display having a large size in display surface area, that is, excellent in the range of vision.

According to one aspect of the present invention there is provided a reflective liquid-crystal display comprising a display assembly and a piezoelectric assembly, on which the display assembly is formed. The display assembly is composed of first- and second transparent nonpiezoelectric-plates having first- and second transparent electrodes, respectively, and a liquid crystal between thereof. The piezoelectric assembly is composed of a piezoelectric substrate, at least one electrode under the piezoelectric substrate, and a counter electrode over the piezoelectric substrate.

When a first electric signal is applied between the electrode under the piezoelectric substrate and the counter electrode, a thickness-mode vibration is excited in the piezoelectric substrate. The thickness-mode vibration in the piezoelectric substrate causes an elastic wave in the liquid crystal. And then, the elastic wave causes a transition from a transparent- to an opaque state in the liquid crystal.

Under the opaque state in the liquid crystal, if a second electric signal is applied between the first- and second transparent electrodes, electric field is applied to at least a part of the liquid crystal. In this time, the electric field causes a transition from the opaque- to the transparent state only in the part. As a result, a light through the part of the liquid crystal is reflected at the counter electrode, having also a function of an optical mirror.

According to another aspect of the present invention there is provided a reflective liquid-crystal display, wherein the first electric signal has a frequency approximately equal to the resonance frequency of thickness-mode in the combination of the second transparent nonpiezoelectric-plate and the piezoelectric substrate.

According to another aspect of the present invention there is provided a piezoelectric substrate made of a piezoelectric ceramic thin plate, of which the polarization axis is parallel to the thickness direction thereof.

According to another aspect of the present invention there is provided a piezoelectric substrate made of a piezoelectric polymer film.

According to another aspect of the present invention there is provided a reflective liquid-crystal display, wherein the phase velocity of the elastic wave traveling in the second transparent nonpiezoelectric-plate alone is lower than that traveling in the piezoelectric substrate alone, and at the same time, higher than that traveling in the liquid crystal alone.

According to another aspect of the present invention there is provided a reflective liquid-crystal display, wherein the phase velocity of the elastic wave traveling in the first transparent nonpiezoelectric plate alone is higher than that traveling in the liquid crystal alone.

According to another aspect of the present invention there is provided a liquid crystal made of a nematic liquid crystal.

According to another aspect of the present invention there is provided a liquid crystal made of a ferroelectric liquid crystal.

According to another aspect of the present invention there are provided first- and second transparent electrodes made of indium-tin oxide, respectively.

According to another aspect of the present invention there are provided first- and second transparent electrodes comprising a group of slender subelectrodes, respectively. Each of the group forms a stripe pattern, and the stripe direction of the groups are orthogonal from each other. If the second electric signal is applied between at least one of the sub-electrodes of the first transparent electrode and that of the second transparent electrode, electric field is applied to at least one crossing zone, in the liquid crystal, between the subelectrodes of the first- and second transparent electrodes. The electric field causes the crossing zone to be in the transparent state.

According to another aspect of the present invention there are provided a first transparent electrode comprising a group of dot-subelectrodes, and a second transparent electrode comprising a plate-shaped electrode. If the second electric signal is applied between at least one of the dot-subelectrodes and the plate-shaped electrode, electric field is applied to at least one zone, in the liquid crystal, between the dot-subelectrode and the plate-shaped electrode. The electric field causes the zone to be in the transparent state.

According to another aspect of the present invention there are provided a first transparent electrode comprising a plate-shaped electrode, and a second transparent electrode comprising a group of dot-subelectrodes. If the second electric signal is applied between the plate-shaped electrode and at least one of the dot-subelectrodes, electric field is applied to at least one zone, in the liquid crystal, between the plate-shaped electrode and the dot-subelectrode. The electric field causes the zone to be in the transparent state.

According to another aspect of the present invention there is provided at least one electrode made of interdigital electrode.

According to another aspect of the present invention there is provided at least one electrode made of interdigital electrode, of which the interdigital periodicity is larger than the thickness of the piezoelectric substrate.

According to another aspect of the present invention there is provided a display assembly further comprising a first transparent polymer-film under the first transparent electrode, and a second transparent polymer-film over the second transparent electrode.

According to another aspect of the present invention there is provided a display assembly further comprising a first transparent polymer film under the first transparent electrode and a second transparent polymer-film over the second transparent electrode. In addition, the liquid crystal is put into a space between the first- and second transparent polymer films with rubbing treatment before the electrode under the piezoelectric substrate and the counter electrode receive the first electric signal.

According to other aspect of the present invention there is provided a display assembly further comprising a metallic thin film as a mirror under the second transparent nonpiezoelectric-plate.

According to a further aspect of the present invention there is provided a display assembly further comprising a color filter. According to another aspect of the present invention there is provided a piezoelectric assembly comprising a piezoelectric substrate, electrodes $E_i$ (i=1, 2, . . . , n) under the piezoelectric substrate, a counter electrode over the piezoelectric substrate, and a switch connected with the electrodes $E_i$. If the first electric signals are applied between the counter electrode and the electrodes $E_i$ via the switch in turn, thickness-mode vibrations corresponding to the electrodes $E_i$ are excited in the piezoelectric substrate in turn. The thickness-mode vibrations cause elastic waves in the liquid crystal. And then, the elastic waves cause a transition from a transparent- to an opaque state in the liquid crystal.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
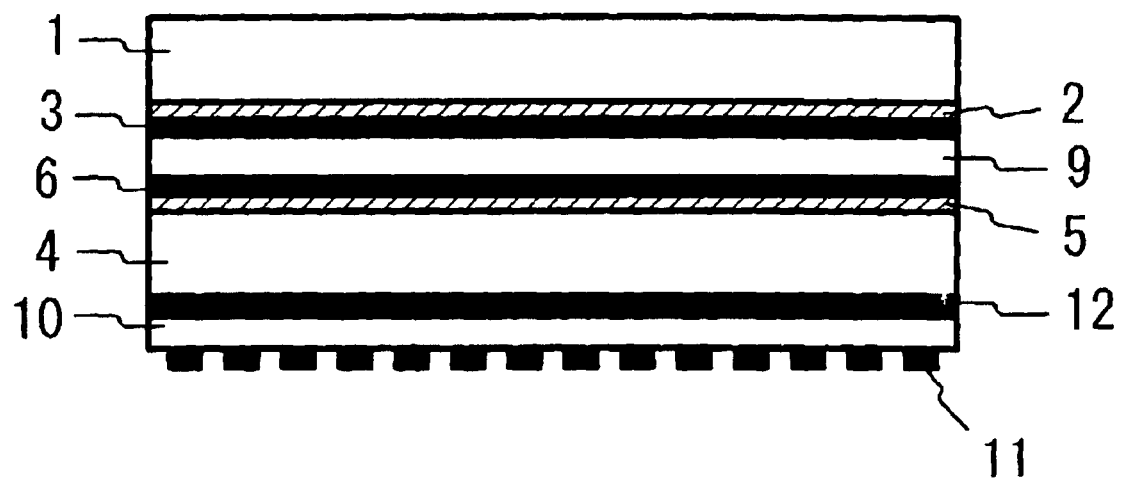
FIG. 1 shows a sectional view of a reflective liquid-crystal display according to an embodiment of the present invention.

FIG. 1 shows a sectional view of a reflective liquid-crystal display according to an embodiment of the present invention. The reflective liquid-crystal display comprises first transparent nonpiezoelectric-plate 1, first transparent electrode 2, first transparent polymer-film 3, second transparent nonpiezoelectric-plate 4, second transparent electrode 5, second transparent polymer-film 6, first spacer 7, second spacer 8, liquid crystal 9, piezoelectric substrate 10, interdigital electrode 11, and counter electrode 12. First spacer 7 and second spacer 8 are not drawn in FIG. 1. First transparent nonpiezoelectric-plate 1, first transparent electrode 2, first transparent polymer-film 3, second transparent nonpiezoelectric-plate 4, second transparent electrode 5, second transparent polymer-film 6, and liquid crystal 9 form a display assembly with a seven-layer structure. Piezoelectric substrate 10, interdigital electrode 11, and counter electrode 12 form a piezoelectric assembly with a three-layer structure, on which the display assembly is fixed through an epoxy resin.

In the piezoelectric assembly in FIG. 1, piezoelectric substrate 10 is made of a piezoelectric ceramic thin plate with a dimension of 200 μm in thickness, and the polarization axis thereof is parallel to the thickness direction thereof. Interdigital electrode 11 made of an aluminum thin film is formed at the lower end-surface of piezoelectric substrate 10, of which the upper end-surface is covered with counter electrode 12 made of aluminum thin film.

In the display assembly in FIG. 1, first transparent nonpiezoelectric-plate 1 made of a glass plate, and second transparent nonpiezoelectric-plate 4 made of another glass plate have a dimension of 1.1 mm in thickness, respectively. In this time, the phase velocity of the elastic wave traveling in second transparent nonpiezoelectric-plate 4 alone is lower than that traveling in piezoelectric substrate 10 alone, and at the same time, higher than that traveling in liquid crystal 9 alone. On the other hand, the phase velocity of the elastic wave traveling in first transparent nonpiezoelectric plate 1 alone is higher than that traveling in liquid crystal 9 alone. First transparent electrode 2 comprising a group of dot-subelectrodes, and second transparent electrode 5 comprising a plate-shaped electrode are made of indium-tin oxide, respectively. The lower end-surface of first transparent nonpiezoelectric-plate 1, and the upper end-surface of second transparent nonpiezoelectric-plate 4 are covered with first transparent electrode 2 and second transparent electrode 5, respectively. First transparent polymer-film 3 and second transparent polymer-film 6 are made of polyimide, respectively. The lower end-surface of first transparent electrode 2, and the upper end-surface of second transparent electrode 5 are coated with first transparent polymer-film 3 and second transparent polymer-film 6, respectively. Liquid crystal 9 made of a nematic liquid crystal is put, without rubbing treatment, into a space, having a dimension of 50 μm in thickness, between first transparent polymer-film 3 and second transparent polymer-film 6. In addition, it is possible to put liquid crystal 9 into the space with rubbing treatment in order to make liquid crystal 9 homogeneously oriented. Furthermore, it is possible to put liquid crystal 9, without rubbing treatment, directly into a space between first transparent electrode 2 without first transparent polymer-film 3 and second transparent electrode 5 without second transparent polymer-film 6. In other words, the lower end-surface of first transparent electrode 2, and the upper end-surface of second transparent electrode 5 can be coated with no transparent polymer-film. Thus, it is easy to provide the reflective liquid-crystal display excellent in durability and manufacturing.

Furthermore, in the reflective liquid-crystal display in FIG. 1, it is possible to use a piezoelectric polymer-film instead of piezoelectric substrate 10, and two polymer-films instead of first transparent nonpiezoelectric-plate 1 and second transparent nonpiezoelectric-plate 4, respectively. The use of such polymer-films enables whole the reflective liquid-crystal display flexible, so that enables, not flat, but curved display. As first transparent nonpiezoelectric-plate 1 and second transparent nonpiezoelectric-plate 4; PET film, acryl film, and other polymer film are convenient.

Figure 2:
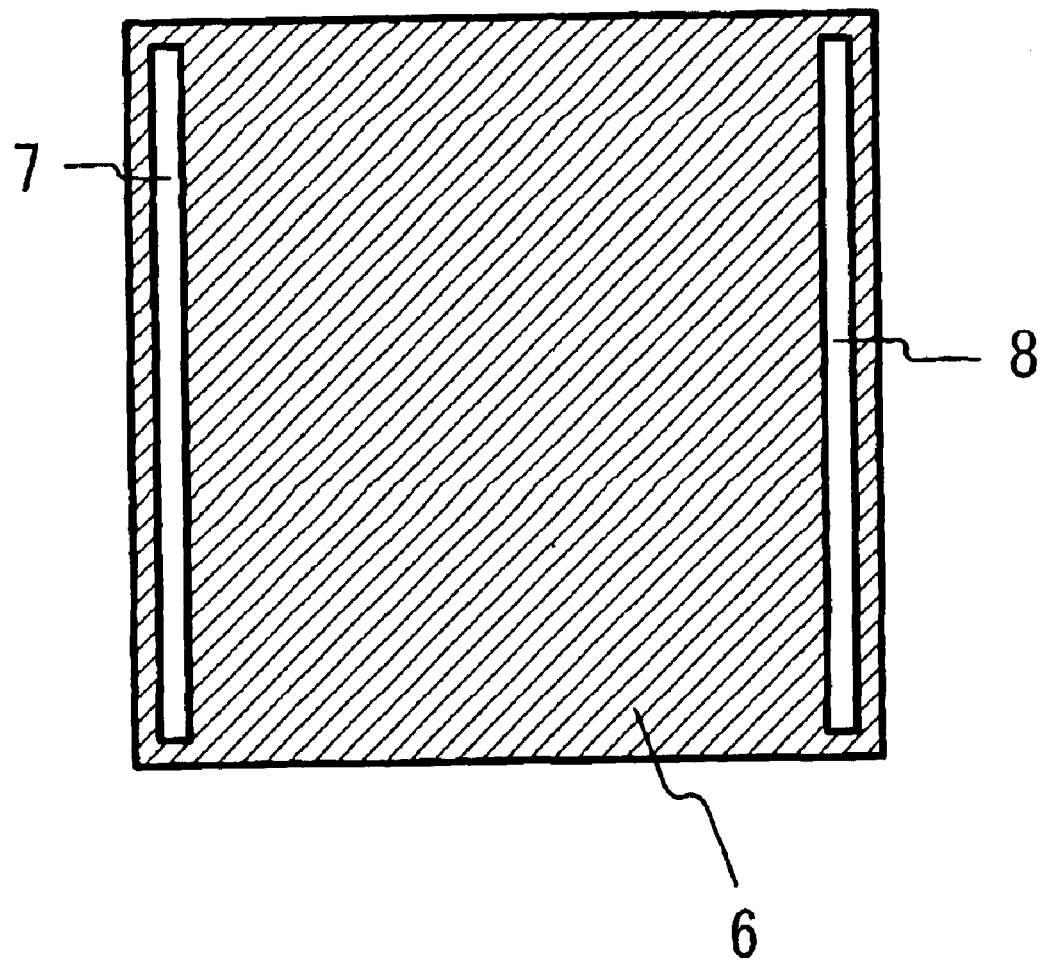
FIG. 2 shows a top plan view of second transparent polymer-film 6, on which first spacer 7 and second spacer 8 are formed.

FIG. 2 shows a top plan view of second transparent polymer-film 6, on which first spacer 7 and second spacer 8 are formed. First spacer 7 and second spacer 8, made of PET films, respectively, make the space, for liquid crystal 9 between first transparent polymer-film 3 and second transparent polymer-film 6, as shown in FIG. 1.

Figure 3:
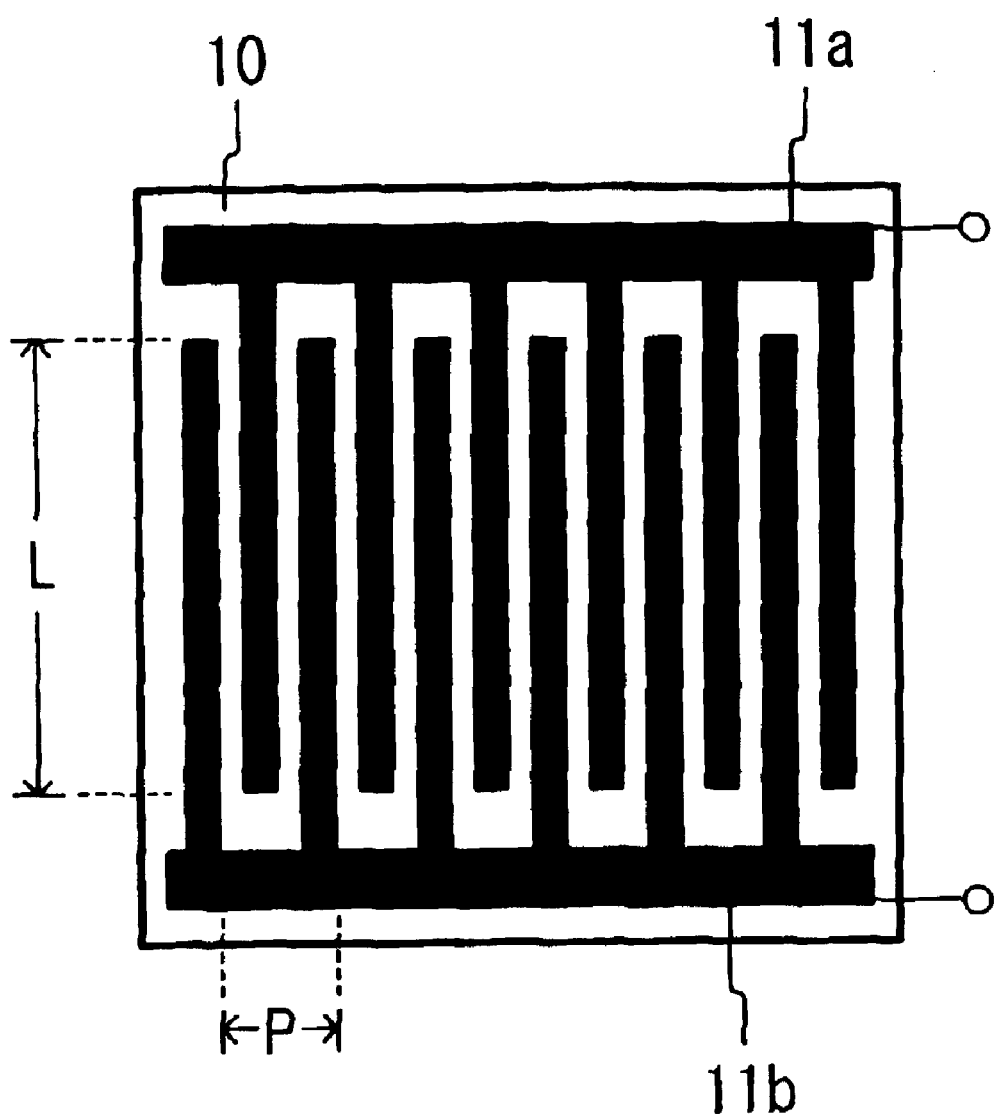
FIG. 3 shows a bottom plan view of the piezoelectric assembly in FIG. 1.

FIG. 3 shows a bottom plan view of the piezoelectric assembly in FIG. 1. Interdigital electrode 11, comprising two comb-shaped electrodes 11a and 11b, has ten electrode-finger pairs, an interdigital periodicity (P) of 300 μm, and a finger-overlap length (L) of 5 mm. It is possible to use both comb-shaped electrodes 11a and 11b simultaneously, or to use comb-shaped electrode 11a alone. In addition, it is possible to use electrode 13, with a simple plate-shape, in place of interdigital electrode 11.

In the reflective liquid-crystal display in FIG. 1, if a first electric signal, having a frequency approximately equal to the resonance frequency of thickness-mode in the combination of second transparent nonpiezoelectric-plate 4 and piezoelectric substrate 10, is applied between counter electrode 12 and a connecting point of comb-shaped electrode 11a with comb-shaped electrode 11b, a thickness-mode vibration is effectively excited in piezoelectric substrate 10, because piezoelectric substrate 10 is made of a piezoelectric ceramic thin plate and the polarization axis thereof is parallel to the thickness direction thereof. In the same way, when the first electric signal is applied between counter electrode 12 and comb-shaped electrode 11a alone, the thickness-mode vibration is excited in piezoelectric substrate 10. In addition, the thickness-mode vibration is excited in piezoelectric substrate 10 when using electrode 13 in place of interdigital electrode 11. The thickness-mode vibration in piezoelectric substrate 10 causes an elastic wave in liquid crystal 9 effectively, because (1) the phase velocity of the elastic wave traveling in second transparent nonpiezoelectric-plate 4 alone is lower than that traveling in piezoelectric substrate 10 alone, and at the same time, higher than that traveling in liquid crystal 9 alone, and (2) the phase velocity of the elastic wave traveling in first transparent nonpiezoelectric plate 1 alone is higher than that traveling in liquid crystal 9 alone. The elastic wave generated in liquid crystal 9 causes a transition from a transparent- to an opaque state in liquid crystal 9. In other words, the elastic wave makes molecular motion in liquid crystal 9 activated.

Under the opaque state in liquid crystal 9 in FIG. 1, if a second electric signal is applied between second transparent electrode 5 and one of subelectrodes of first transparent electrode 2, electric field is applied to a zone, in liquid crystal 9 between second transparent electrode 5 and the one of subelectrodes of first transparent electrode 2. In this time, the electric field causes a transition from the opaque- to the transparent state only in the zone with high accuracy and clearness. In other words, the electric field makes molecular orientation only in the zone unified. In this way, over two transitions from the opaque- to the transparent state in over two zones, respectively, can be performed simultaneously, so that counter electrode 12, having also a function of an optical mirror, reflects lights through the zones, respectively. The same result can be obtained in case that first transparent electrode 2 comprises a plate-shaped electrode and second transparent electrode 5 comprises a group of dot-subelectrodes.

Figure 4:
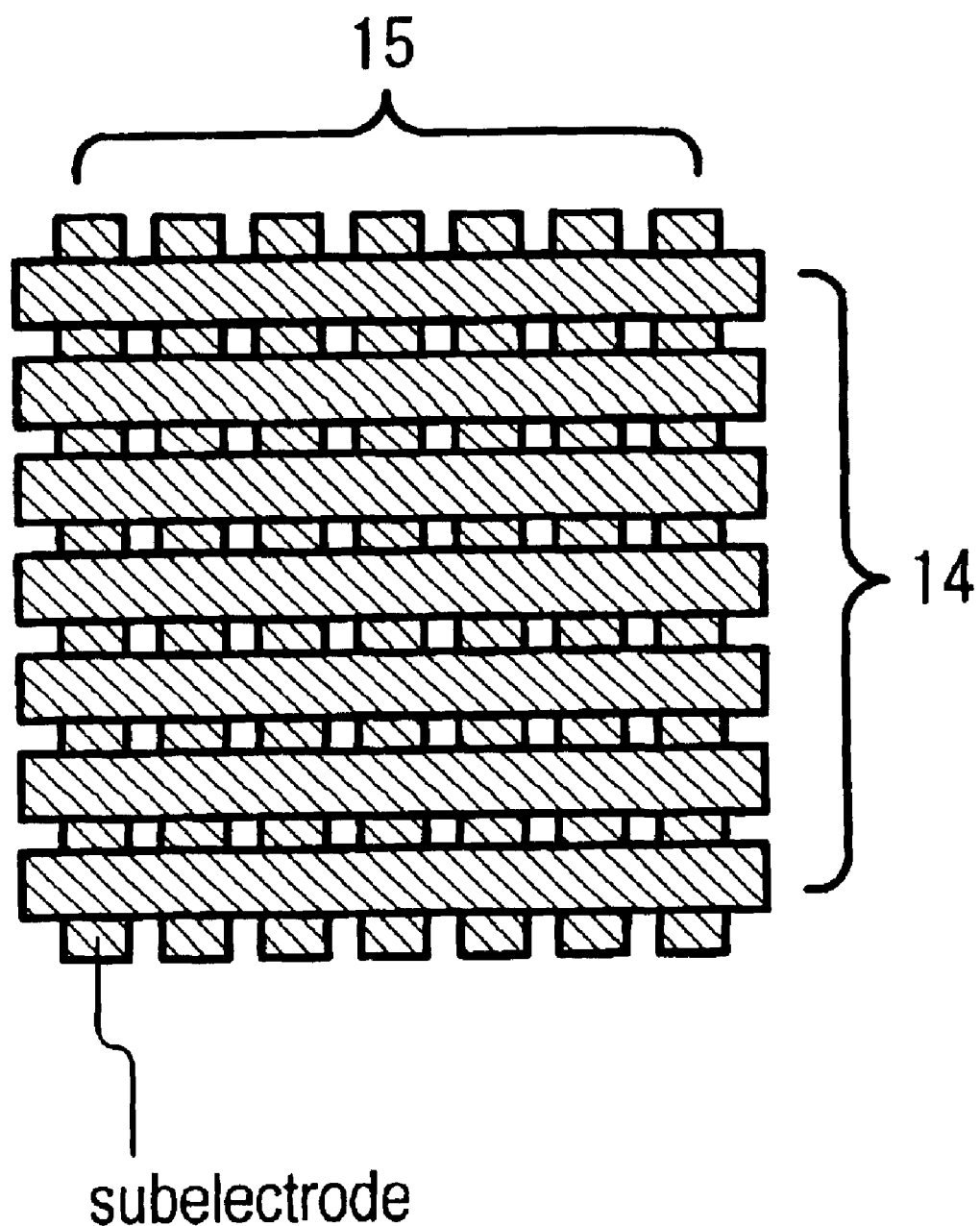
FIG. 4 shows a skeleton illustration of first transparent electrode 14 instead of first transparent electrode 2, and second transparent electrode instead of second transparent electrode 5 in FIG. 1.

FIG. 4 shows a skeleton illustration of first transparent electrode 14 instead of first transparent electrode 2, and second transparent electrode 15 instead of second transparent electrode 5 in FIG. 1. First transparent electrode 14 comprises a group of slender subelectrodes forming a stripe pattern. Second transparent electrode 15 has the same construction as first transparent electrode 14, except that a stripe direction of first transparent electrode 14 and that of second transparent electrode 15 are orthogonal from each other.

When using first transparent electrode 14 and second transparent electrode 15 in FIG. 4, the second electric signal is applied, for example, between a second subelectrode of first transparent electrode 14 and a seventh subelectrode of second transparent electrode 15. In this time, electric field is applied to a crossing zone, in liquid crystal 9 between the second subelectrode of first transparent electrode 14 and the seventh subelectrode of second transparent electrode 15. Thus, the electric field causes a transition from the opaque- to the transparent state only in the crossing zone. In this way, over two transitions from the opaque- to the transparent state in over two crossing zones, respectively, can be performed simultaneously, so that lights through the crossing zones, respectively, are reflected at counter electrode 12.

After all, the use of the piezoelectric assembly as shown in FIG. 1 provides a reflection-type display with no light source, and no polarizers in the display assembly. As a result, the reflective liquid-crystal display in FIG. 1 has a small size in layer thickness and a simple structure which is very light in weight.

Figure 5:
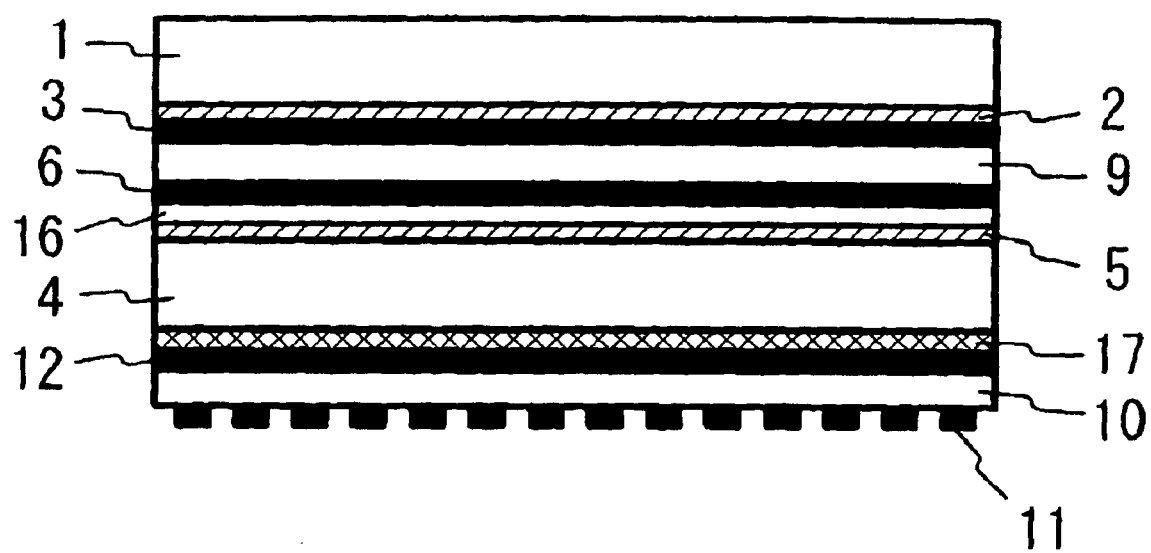
FIG. 5 shows a sectional view of the display assembly with color filter 16 and mirror 17.

FIG. 5 shows a sectional view of the display assembly with color filter 16 and mirror 17. In the display assembly in FIG. 1, it is possible to form color filter 16 between second transparent electrode 5 and second transparent polymer-film 6. In this case, supplying three neighboring zones, in liquid crystal 9, corresponding to red, green and blue, respectively, with voltages of varying amplitude blends the red, green, and blue to make various colors and tones. Thus, it is possible to provide a full-color type display. In addition, it is possible to form mirror 17 made of aluminum thin film under second transparent nonpiezoelectric-plate 4 in order to make a light reflection more effectively. In this case, the display assembly in FIG. 5 is fixed through an epoxy resin on the piezoelectric assembly in FIG. 1. Moreover, if necessary, a light source can be formed in place of mirror 17.

Figure 6:
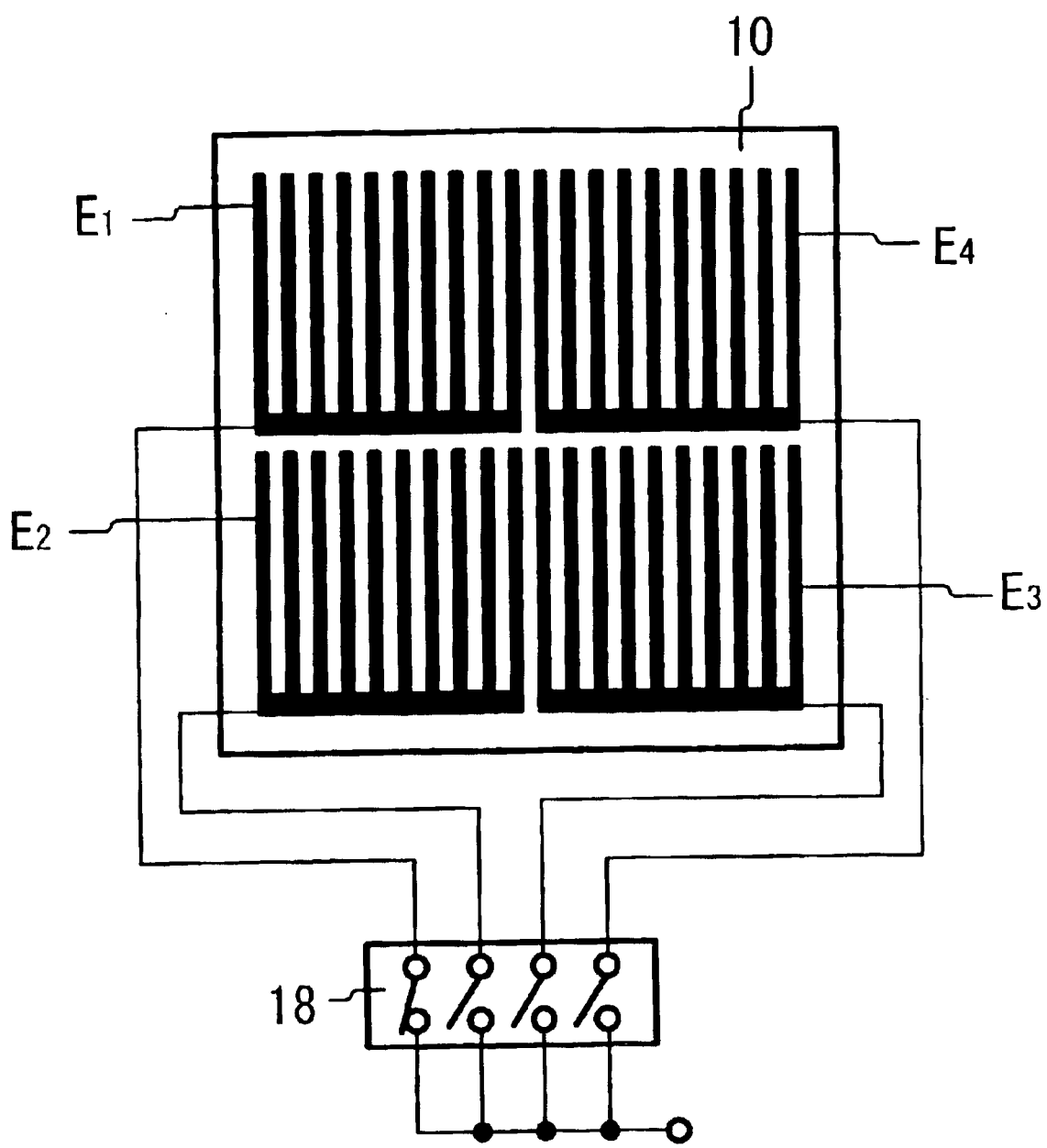
FIG. 6 shows a bottom plan view of the piezoelectric assembly having interdigital electrodes $E_1$, $E_2$, $E_3$ and $E_4$ in place of interdigital electrode 11.

FIG. 6 shows a bottom plan view of the piezoelectric assembly having interdigital electrodes $E_1$, $E_2$, $E_3$ and $E_4$ in place of interdigital electrode 11. FIG. 6 further shows switch 18. Interdigital electrodes $E_1$, $E_2$, $E_3$ and $E_4$ have a single-comb structure, respectively.

In the piezoelectric assembly in FIG. 6, the first electric signal is applied between counter electrode 12, and interdigital electrode $E_1$, $E_2$, $E_3$ or $E_4$ in turn via switch 18. In this time, thickness-mode vibrations corresponding to interdigital electrodes $E_1$, $E_2$, $E_3$ and $E_4$, respectively, are effectively excited in piezoelectric substrate 10 in turn. The thickness-mode vibrations cause elastic waves in liquid crystal 9 effectively, and the elastic waves cause the transition from the transparent- to the opaque state in liquid crystal 9. Thus, the use of electrodes $E_i$ (i=1, 2, . . . , n) enables the size in display surface area large, that is, enables a display excellent in the range of vision.

Figure 7:
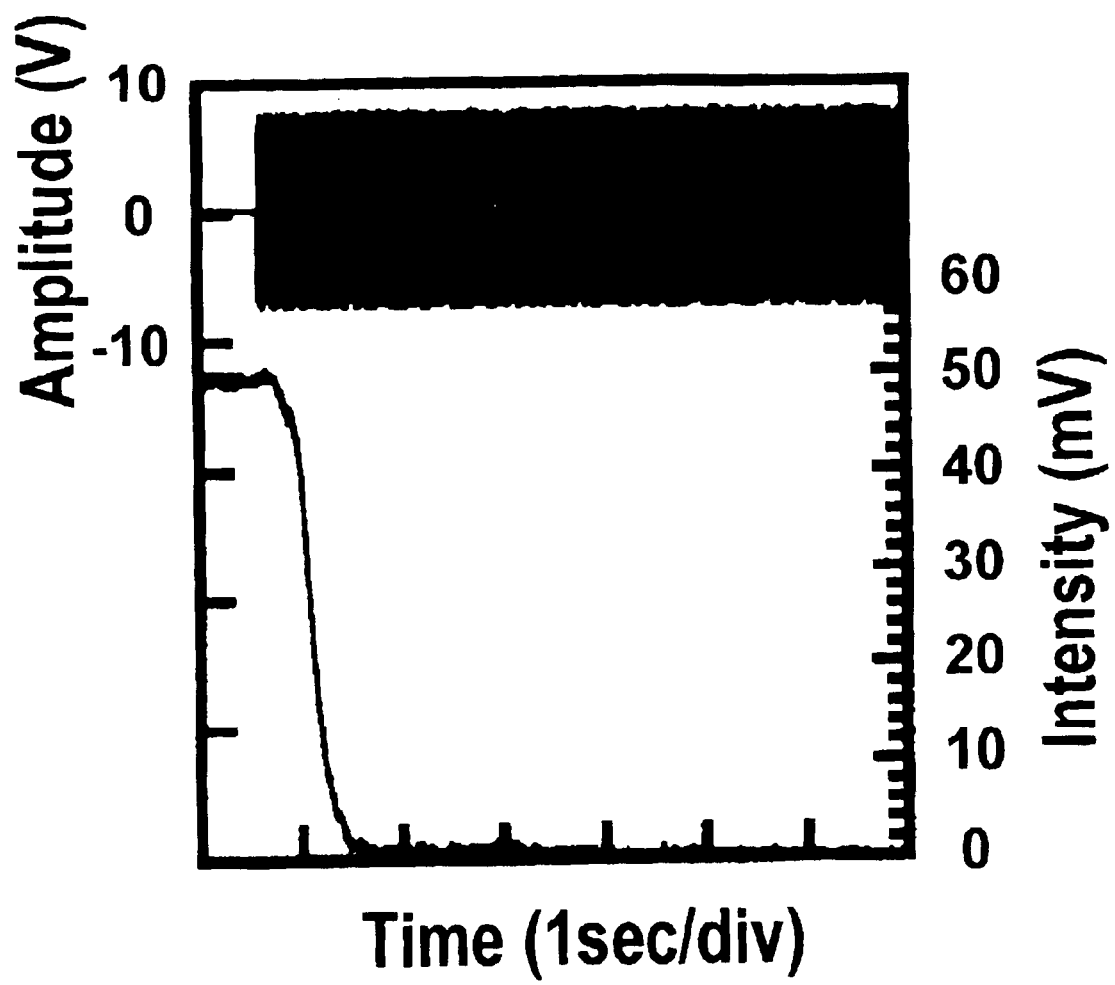
FIG. 7 shows a relationship between the reflected-light intensity through liquid crystal 9 with rubbing treatment, and the time from the application of the first electric signal with a frequency of 10.72 MHz in case of the use of electrode 13 instead of interdigital electrode 11.

FIG. 7 shows a relationship between the reflected-light intensity through liquid crystal 9 with rubbing treatment, and the time from the application of the first electric signal with a frequency of 10.72 MHz in case of the use of electrode 13 instead of interdigital electrode 11. FIG. 7 further shows the amplitude in voltage of the first electric signal of 8 V. It is clear that the reflected-light intensity quickly decreases just after the application of the first electric signal. In other words, the application of the first electric signal causes a transition from the transparent- to the opaque state in liquid crystal 9.

Figure 8:
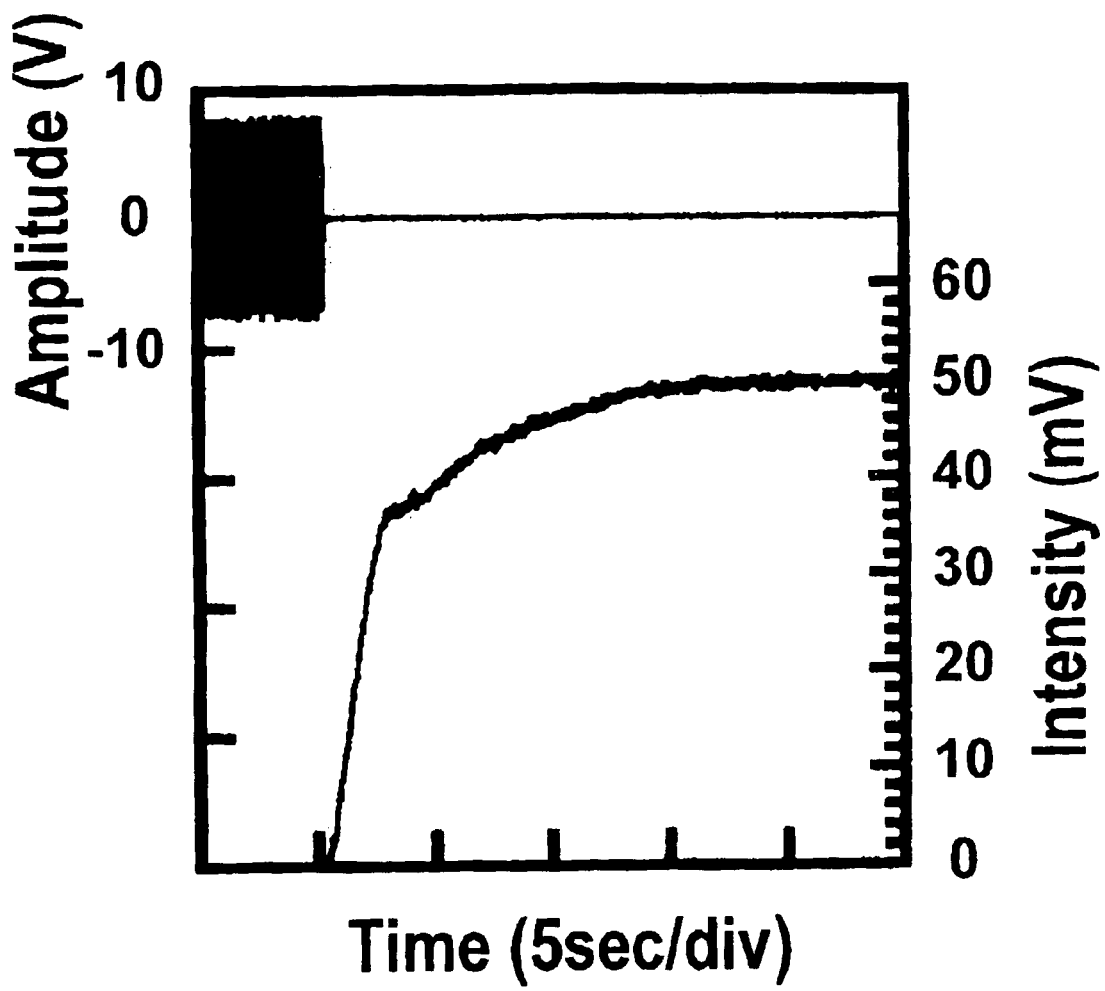
FIG. 8 shows a relationship between the reflected-light intensity through liquid crystal 9 with rubbing treatment, and the time from the drop of the first electric signal of 10.72 MHz in case of the use of electrode 13 instead of interdigital electrode 11.

FIG. 8 shows a relationship between the reflected-light intensity through liquid crystal 9 with rubbing treatment, and the time from the drop of the first electric signal of 10.72 MHz in case of the use of electrode 13 instead of interdigital electrode 11. FIG. 8 further shows the amplitude in voltage of the first electric signal of 8 V. It should be noticed that the reflected-light intensity quickly increases just after the drop of the first electric signal, and then, gradually increases as time goes on. In addition, it is clear from FIGS. 7 and 8 that the reflective liquid-crystal display in FIG. 1 is excellent in brightness. It is ascertained that the brightness reaches 70%.

Figure 9:
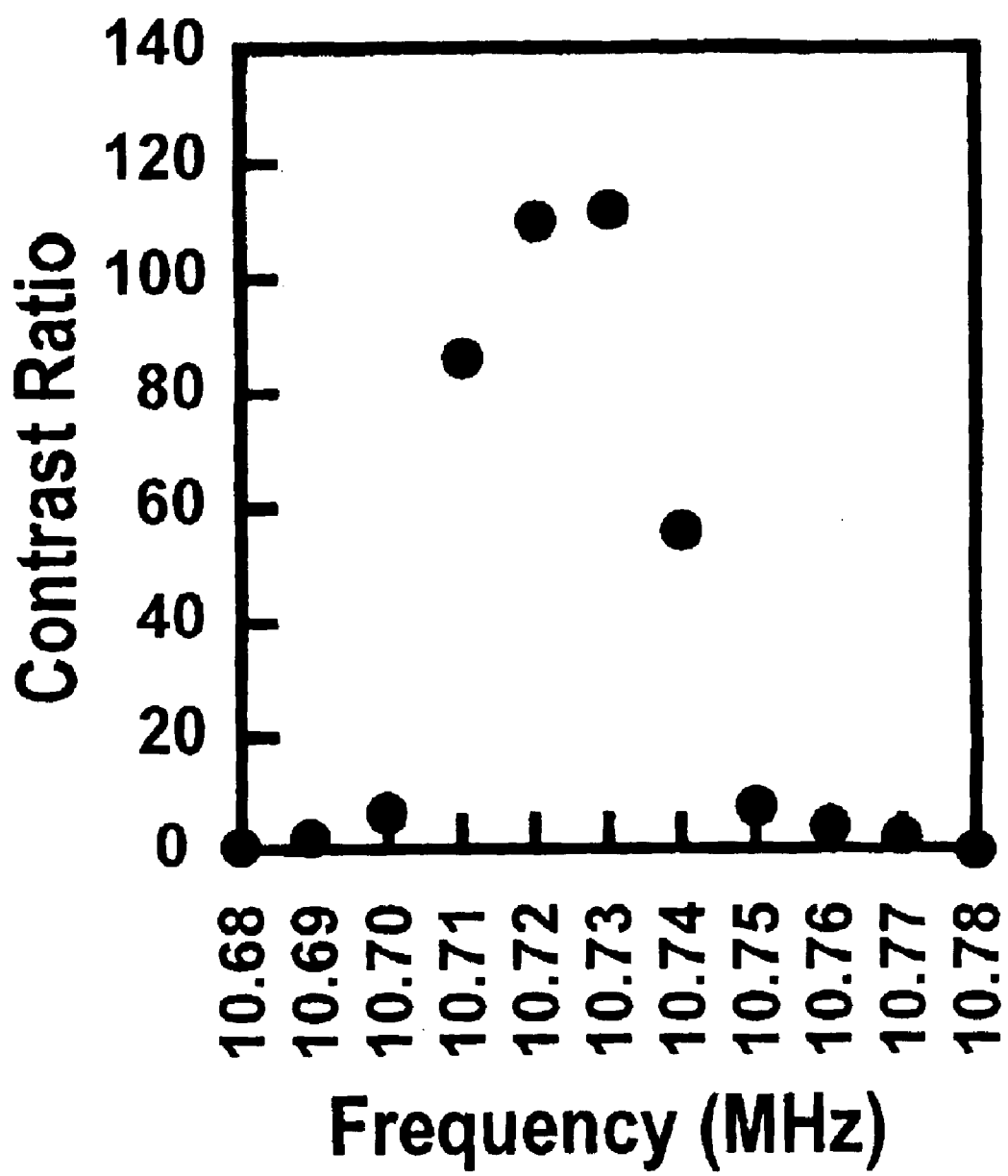
FIG. 9 shows a relationship between the contrast ratio of the transparent- to the opaque state in liquid crystal 9 with rubbing treatment, and the frequency of the first electric signal in case of the use of electrode 13 instead of interdigital electrode 11.

FIG. 9 shows a relationship between the contrast ratio of the transparent- to the opaque state in liquid crystal 9 with rubbing treatment, and the frequency of the first electric signal in case of the use of electrode 13 instead of interdigital electrode 11. The contrast between light and shade is defined as that between the reflected-light intensity under the transparent state, and the reflected-light intensity under the opaque state. Thus, the contrast ratio of light to shade in FIG. 9 has a peak around 10.73 MHz, which is approximately the same as the resonance frequency of thickness-mode in the combination of second transparent nonpiezoelectric-plate 4 and piezoelectric substrate 10. Thus, the reflective liquid-crystal display in FIG. 1 is excellent in contrast ratio.

Figure 10:
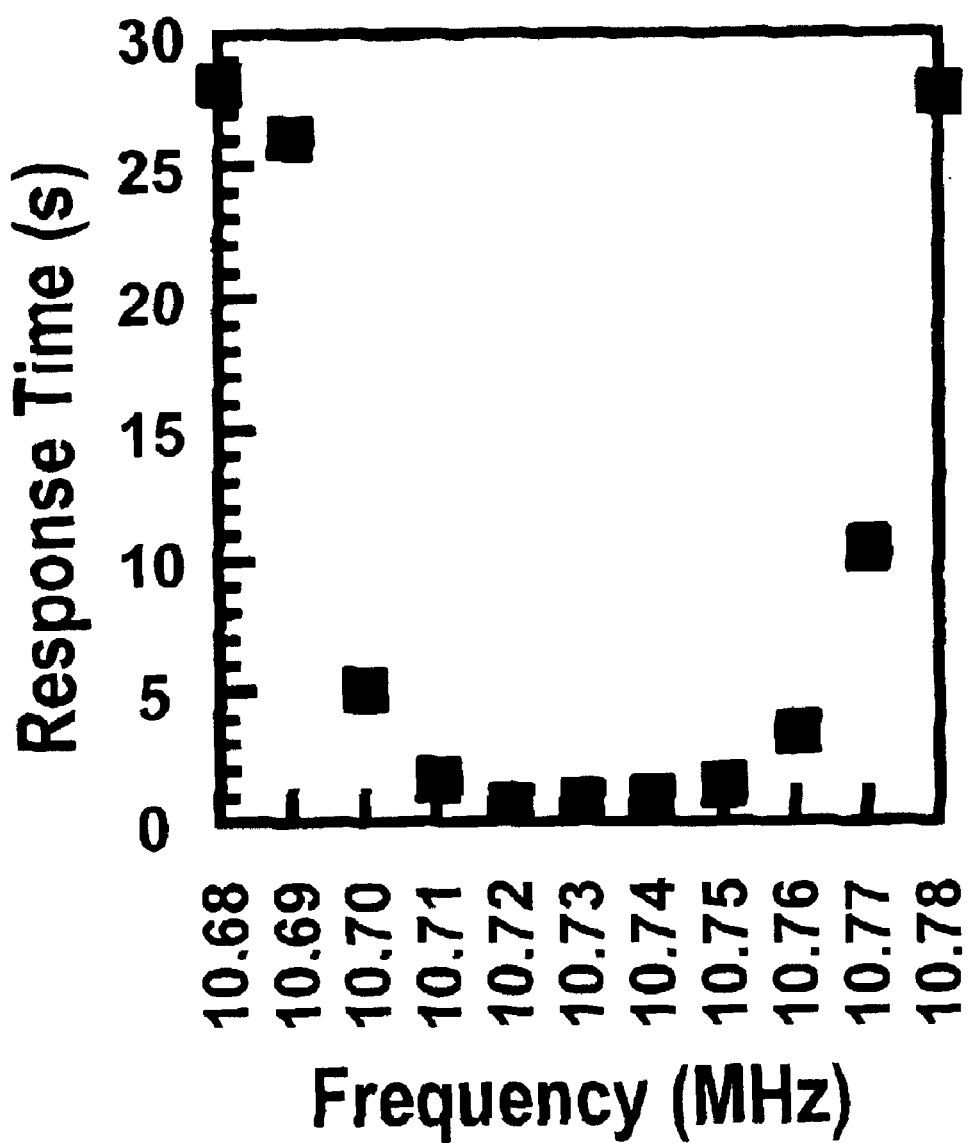
FIG. 10 shows a relationship between the response time and the frequency of the first electric signal of 8 V in case of the use of electrode 13 instead of interdigital electrode 11.

FIG. 10 shows a relationship between the response time and the frequency of the first electric signal of 8 V in case of the use of electrode 13 instead of interdigital electrode 11. The response time in FIG. 10 is defined as a period from 100 to 10% of the reflected-light intensity through liquid crystal 9, with rubbing treatment, after the application of the first electric signal. It should be noticed that the response time is especially quick around 10.73 MHz. The quicker response time after the application of the first electric signal, the more convenient for the display assembly in FIG. 1.

Figure 11:
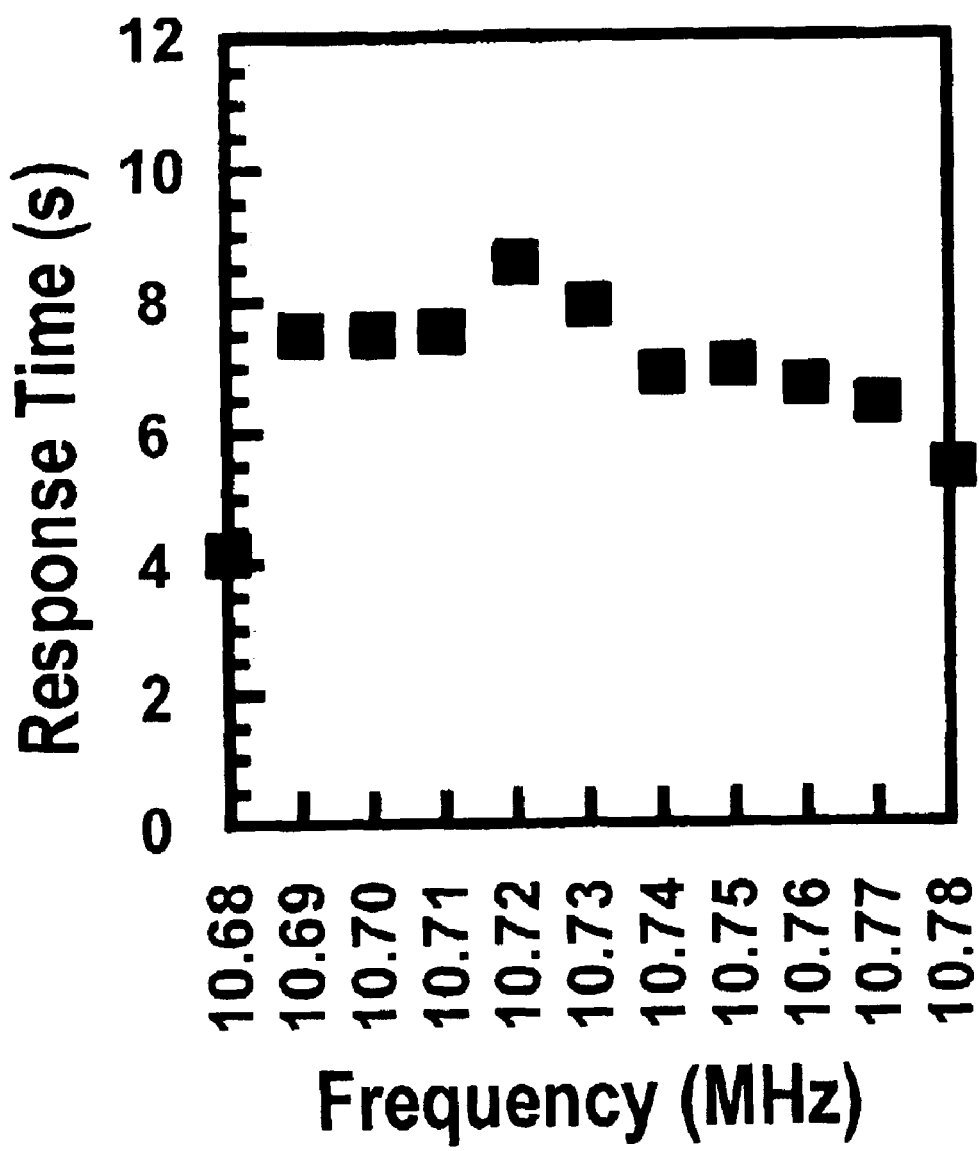
FIG. 11 shows a relationship between the response time and the frequency of the first electric signal of 8 V in case of the use of electrode 13 instead of interdigital electrode 11.

FIG. 11 shows a relationship between the response time and the frequency of the first electric signal of 8 V in case of the use of electrode 13 instead of interdigital electrode 11. The response time in FIG. 11 is defined as a period from 0 to 90% of the reflected-light intensity through liquid crystal 9, with rubbing treatment, after the drop of the first electric signal. It should be noticed that the response time at 10.72 MHz is slower than the rest. The slower response time after the drop of the first electric signal, the lower electric power for keeping the opaque state in liquid crystal 9 long, that is, the more convenient for the display assembly in FIG. 1. Thus, it is possible to use a burst-wave signal as the first electric signal.

Figure 12:
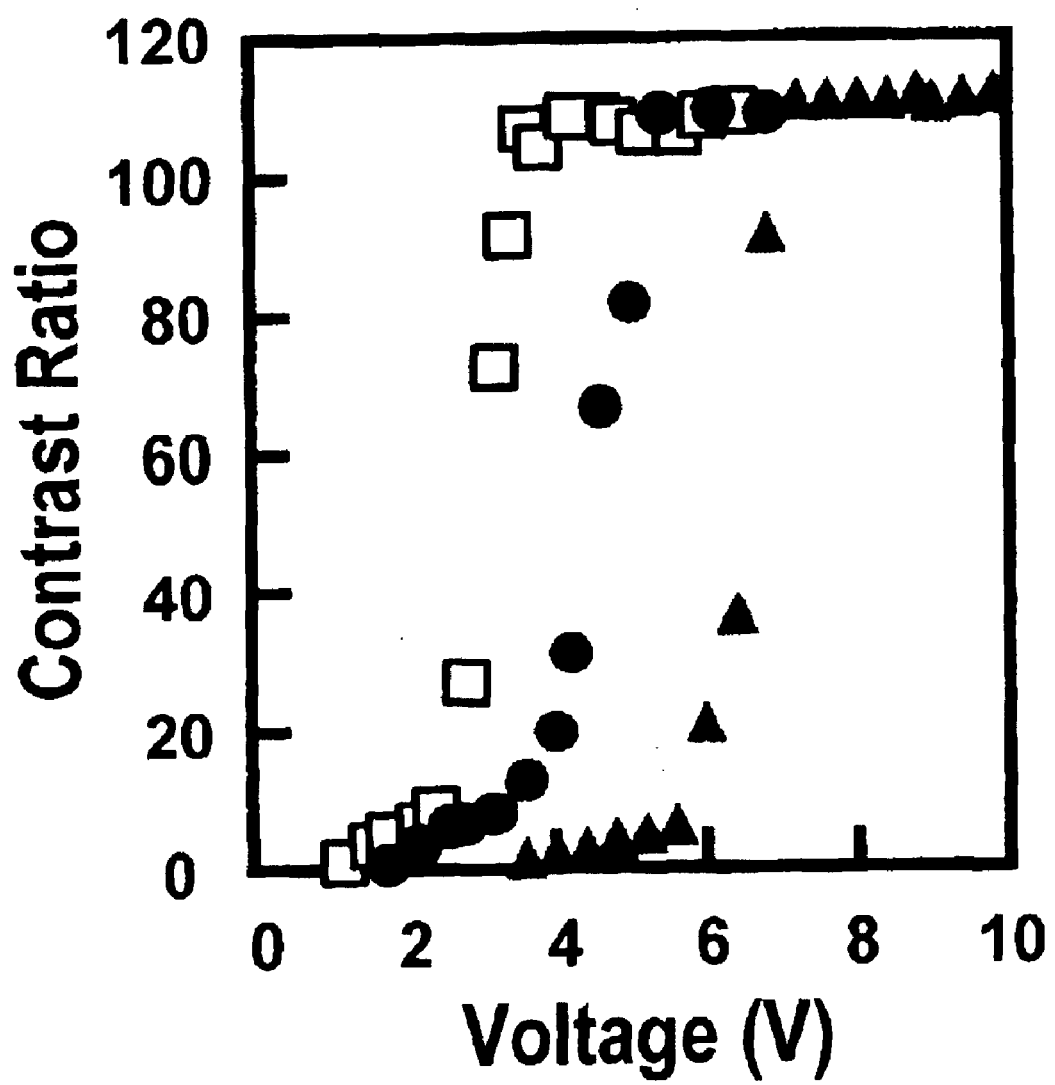
FIG. 12 shows a relationship between the contrast ratio of the transparent- to the opaque state in liquid crystal 9 with rubbing treatment, and the voltage of the first electric signal in case of the use of both comb-shaped electrodes 11a and 11b (□), comb-shaped electrode 11a alone (●), or electrode 13 (▲) instead of interdigital electrode 11.

FIG. 12 shows a relationship between the contrast ratio of the transparent- to the opaque state in liquid crystal 9 with rubbing treatment, and the voltage of the first electric signal in case of the use of both comb-shaped electrodes 11a and 11b (□), comb-shaped electrode 11a alone (●), or electrode 13 (▲) instead of interdigital electrode 11. The contrast ratio is estimated from the reflected-light intensities under the transparent- and opaque states. It is clear that the contrast ratio in case of the use of both comb-shaped electrodes 11a and 11b (□) is superior to the rest. In short, only a little voltage of the first electric signal causes a large contrast ratio when using both comb-shaped electrodes 11a and 11b.

Figure 13:
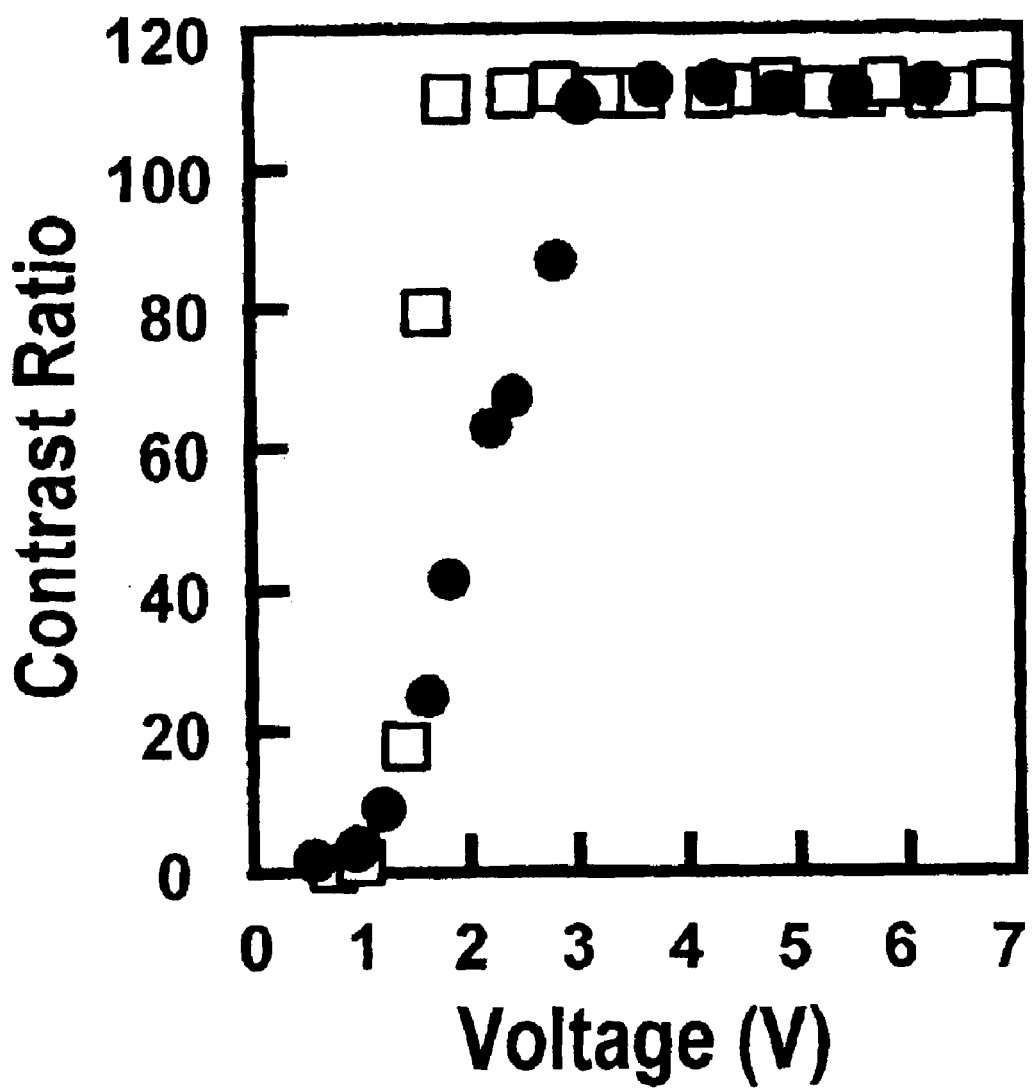
FIG. 13 shows a relationship between the contrast ratio of the transparent- to the opaque state in liquid crystal 9 without rubbing treatment, and the voltage of the first electric signal in case of the use of both comb-shaped electrodes 11a and 11b (□), or comb-shaped electrode 11a alone (●).

FIG. 13 shows a relationship between the contrast ratio of the transparent- to the opaque state in liquid crystal 9 without rubbing treatment, and the voltage of the first electric signal in case of the use of both comb-shaped electrodes 11a and 11b (□), or comb-shaped electrode 11a alone (●). The contrast ratio is estimated from the reflected-light intensities under the transparent- and opaque states. It is clear that the contrast ratio in case of the use of both comb-shaped electrodes 11a and 11b (□) is superior to that of comb-shaped electrode 11a alone (●). Thus, only a little voltage of the first electric signal causes a large contrast ratio when using both comb-shaped electrodes 11a and 11b, and liquid crystal 9 without rubbing treatment. In addition, it is clear from FIGS. 12 and 13 that the use of liquid crystal 9 without rubbing treatment is superior to that with rubbing treatment. In other words, the use of liquid crystal 9 without rubbing treatment needs a lower voltage than that with rubbing treatment, so that protects liquid crystal 9 against inferiority.

Figure 14:
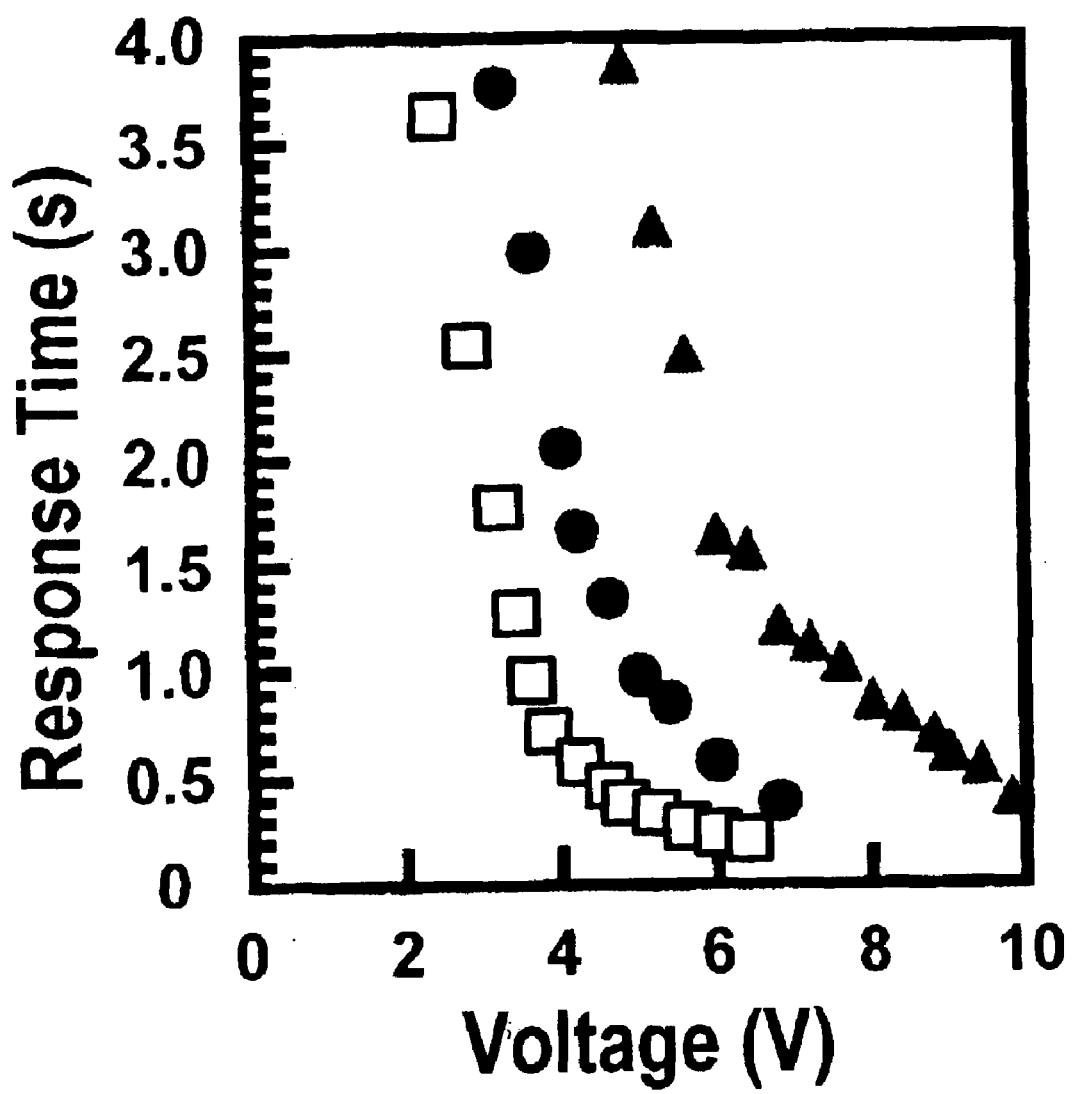
FIG. 14 shows a relationship between the response time and the voltage of the first electric signal in case of the use of both comb-shaped electrodes 11a and 11b (□), comb-shaped electrode 11a alone (●), or electrode 13 (▲) instead of interdigital electrode 11.

FIG. 14 shows a relationship between the response time and the voltage of the first electric signal in case of the use of both comb-shaped electrodes 11a and 11b (□), comb-shaped electrode 11a alone (●), or electrode 13 (▲) instead of interdigital electrode 11. The response time in FIG. 14 is defined as a period from 100 to 10% of the reflected-light intensity through liquid crystal 9, with rubbing treatment, after the application of the first electric signal. It is clear that the response time in case of the use of both comb-shaped electrodes 11a and 11b (□) is superior to the rest. In other words, only a little voltage of the first electric signal causes a quick response time when using both comb-shaped electrodes 11a and 11b.

Figure 15:
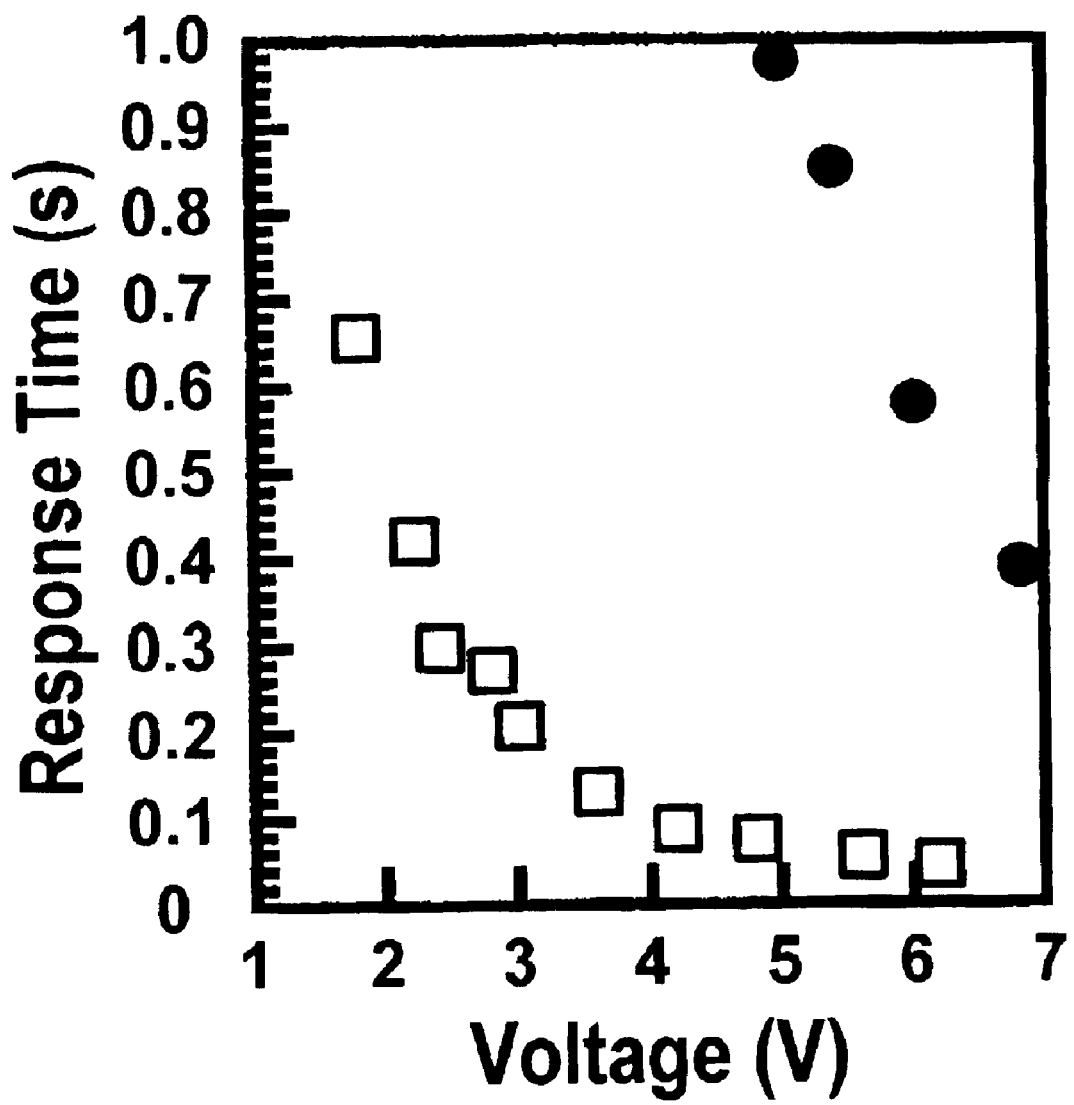
FIG. 15 shows a relationship between the response time and the voltage of the first electric signal in case of the use of comb-shaped electrode 11a alone.

FIG. 15 shows a relationship between the response time and the voltage of the first electric signal in case of the use of comb-shaped electrode 11a alone. The response time in FIG. 15 is defined as a period from 100 to 10% of the reflected-light intensity through liquid crystal 9, without rubbing treatment (□), or with rubbing treatment (●), after the application of the first electric signal. It is clear that the response time in case of no rubbing treatment (□) is superior to that of rubbing treatment (●). In other words, only a little voltage of the first electric signal causes a quick response time in case of no rubbing treatment (□).

Figure 16:
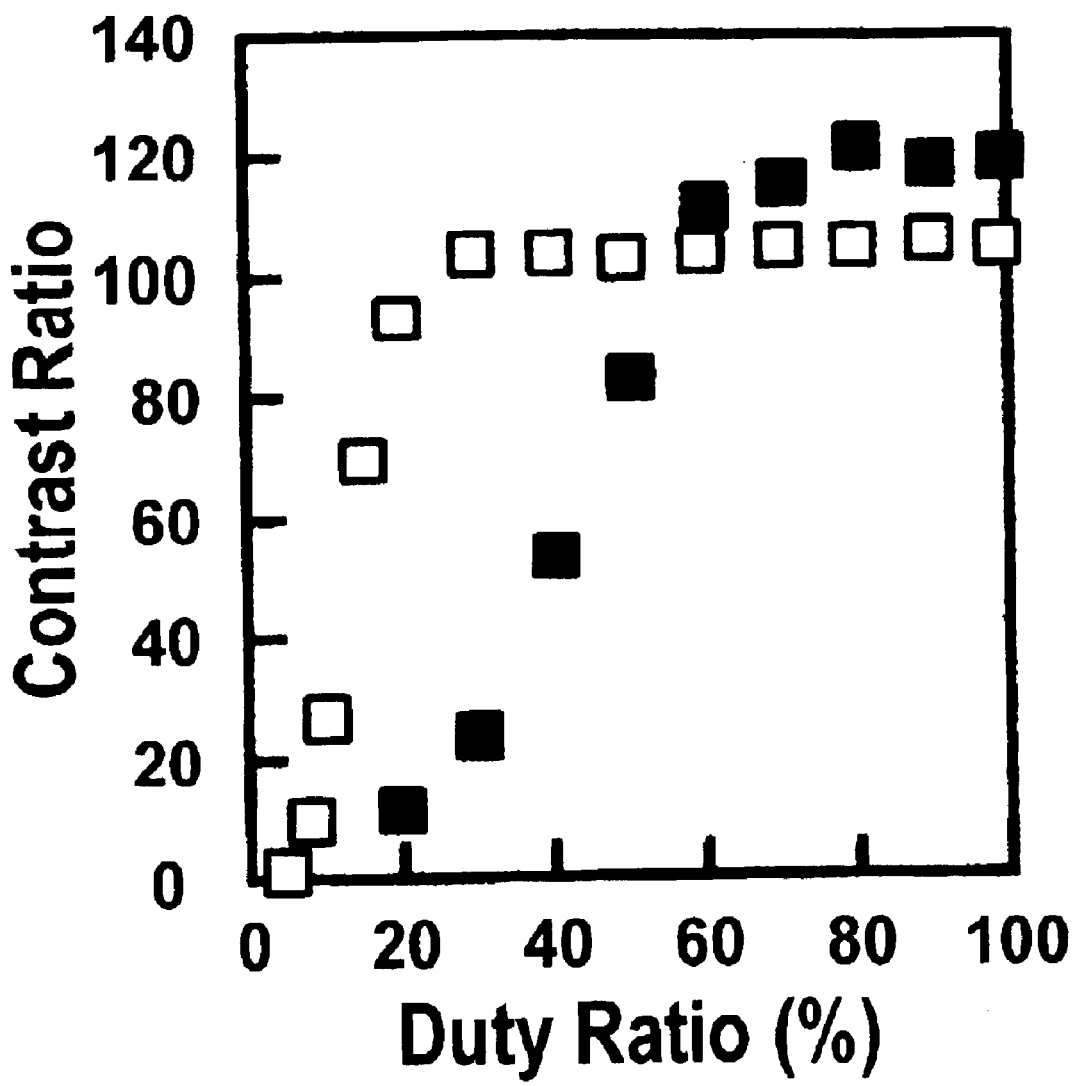
FIG. 16 shows a relationship between the contrast ratio of the transparent- to the opaque state in liquid crystal 9 without rubbing treatment (□), or with rubbing treatment (■), and the duty ratio of a burst-wave signal as the first electric signal of 8 V in case of the use of comb-shaped electrode 11a alone.

FIG. 16 shows a relationship between the contrast ratio of the transparent- to the opaque state in liquid crystal 9 without rubbing treatment (□), or with rubbing treatment (■), and the duty ratio of a burst-wave signal as the first electric signal of 8 V in case of the use of comb-shaped electrode 11a alone. In this time, the burst-wave signal of 8 V has a frequency of 30 Hz, and each burst has a carrier frequency of 10.72 MHz. It should be noticed that the contrast ratio in case of rubbing treatment (■) gradually increases, and that of no rubbing treatment (□) rapidly increases according to the increase in duty ratio. In short, the contrast ratio in case of no rubbing treatment (□) is superior to that of rubbing treatment (■). In addition, it is already ascertained that the contrast ratio is approximately constant, independent of the frequency of the burst-wave signal. Thus, the use of the burst-wave signal enables lower electric power consumption.

Figure 17:
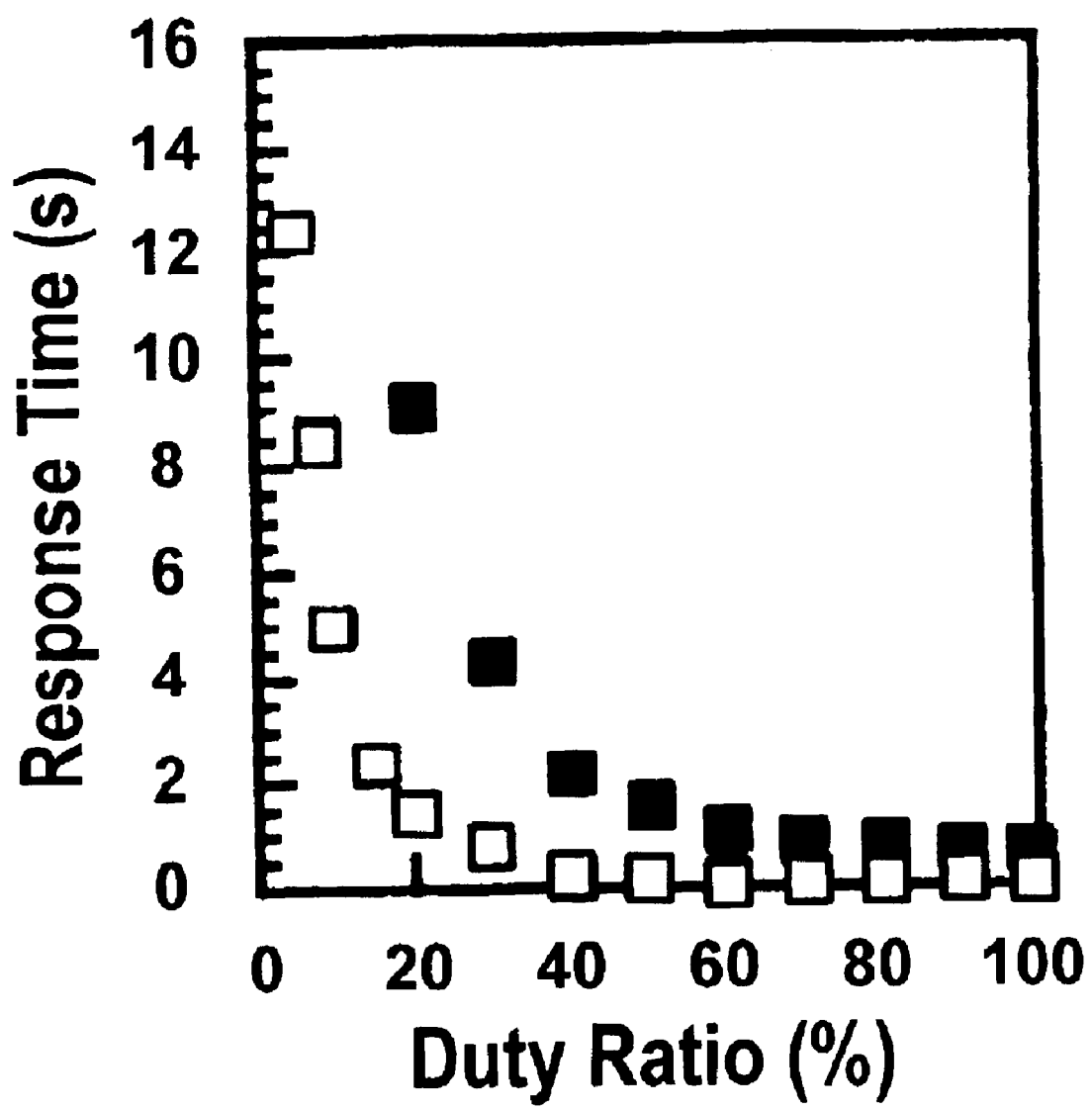
FIG. 17 shows a relationship between the response time and the duty ratio of a burst-wave signal as the first electric signal of 8 V in case of the use of comb-shaped electrode 11a alone.

FIG. 17 shows a relationship between the response time and the duty ratio of a burst-wave signal as the first electric signal of 8 V in case of the use of comb-shaped electrode 11a alone. In this time, the burst-wave signal of 8 V has a frequency of 30 Hz, and each burst has a carrier frequency of 10.72 MHz. The response time in FIG. 17 is defined as a period from 100 to 10% of the reflected-light intensity through liquid crystal 9, without rubbing treatment (□), or with rubbing treatment (■), after the application of the burst-wave signal. It is clear that the response time in case of rubbing treatment (■) gradually decreases, and that of no rubbing treatment (□) rapidly decreases according to the increase in duty ratio. In a word, the response time in case of no rubbing treatment (□) is superior to that of rubbing treatment (■).

Figure 18:
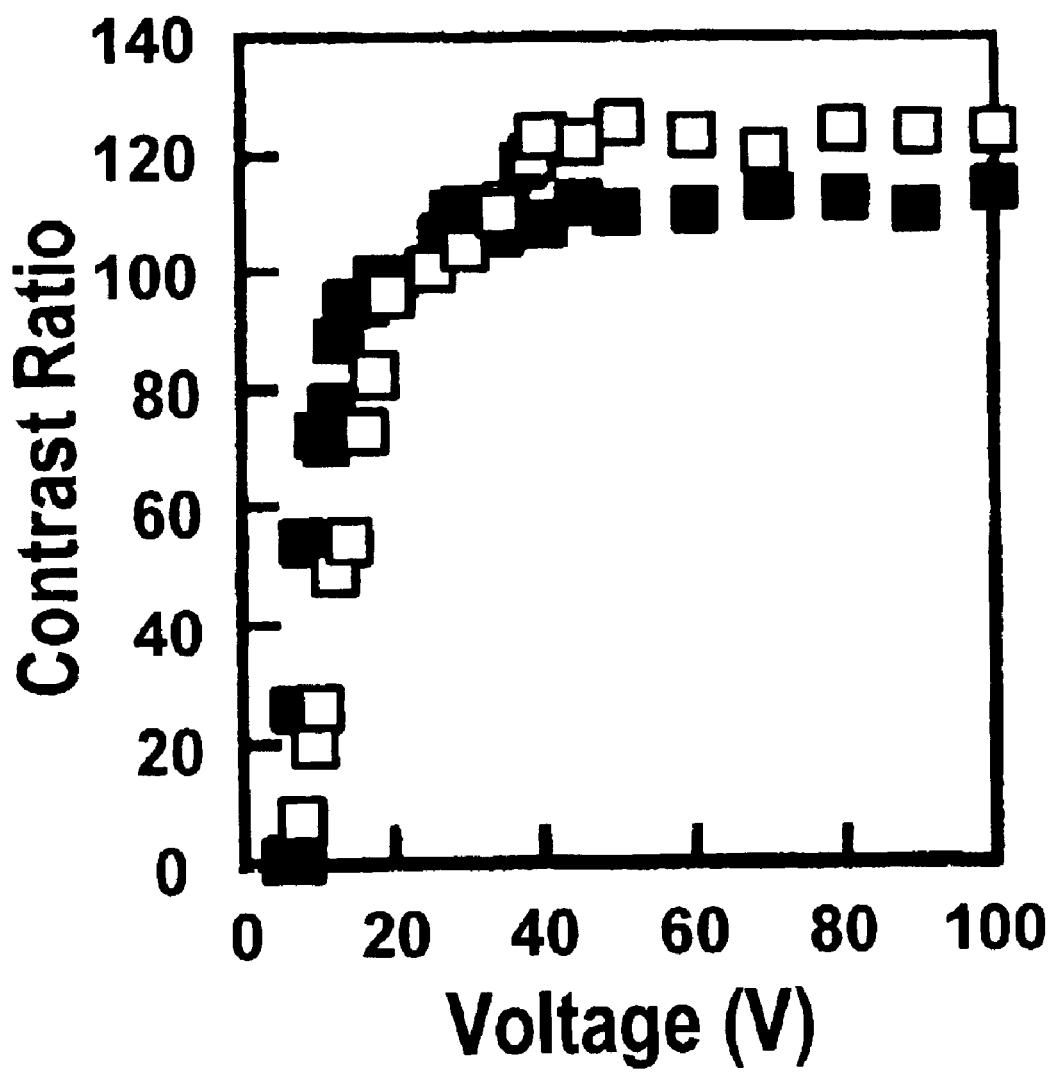
FIG. 18 shows a relationship between the contrast ratio of the transparent- to the opaque state in liquid crystal 9 without rubbing treatment (□), or with rubbing treatment (■), and the voltage of the second electric signal in case of the use of comb-shaped electrode 11a alone.

FIG. 18 shows a relationship between the contrast ratio of the transparent- to the opaque state in liquid crystal 9 without rubbing treatment (□), or with rubbing treatment (■), and the voltage of the second electric signal in case of the use of comb-shaped electrode 11a alone. It should be noticed that the contrast ratio in case of no rubbing treatment (□) is superior to that of rubbing treatment (■). Thus, the reflective liquid-crystal display in FIG. 1 is excellent in contrast ratio.

Figure 19:
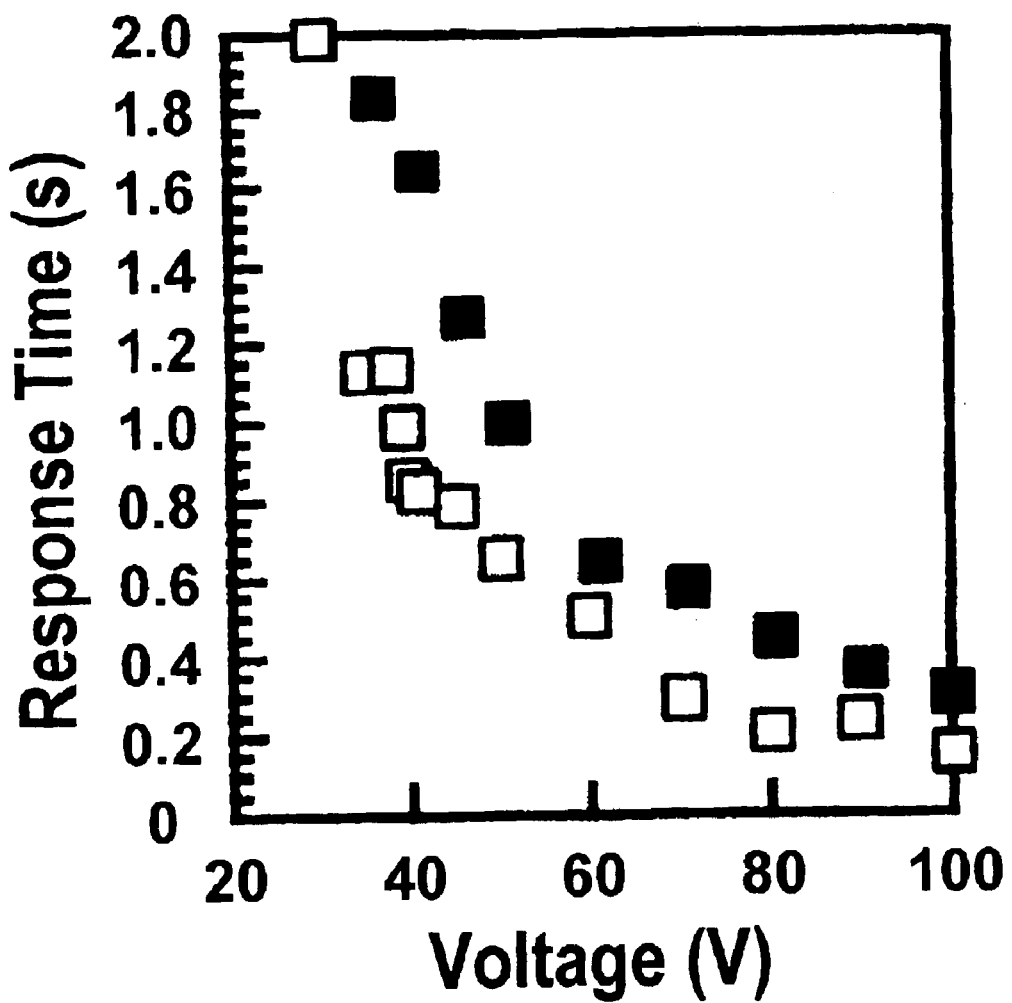
FIG. 19 shows a relationship between the response time and the voltage of the second electric signal in case of the use of comb-shaped electrode 11a alone.

FIG. 19 shows a relationship between the response time and the voltage of the second electric signal in case of the use of comb-shaped electrode 11a alone. The response time in FIG. 19 is defined as a period from 0 to 90% of the reflected-light intensity through liquid crystal 9, without rubbing treatment (□), or with rubbing treatment (■), after the application of the second electric signal. It should be noticed that the response time in case of no rubbing treatment (□) is superior to that of rubbing treatment (■). Moreover, it is possible to make the response time more quickly if making the dimension in thickness of liquid crystal 9 smaller. Furthermore, it is possible to make the response time quickly if using a ferroelectric liquid crystal as liquid crystal 9.

Figure 20:
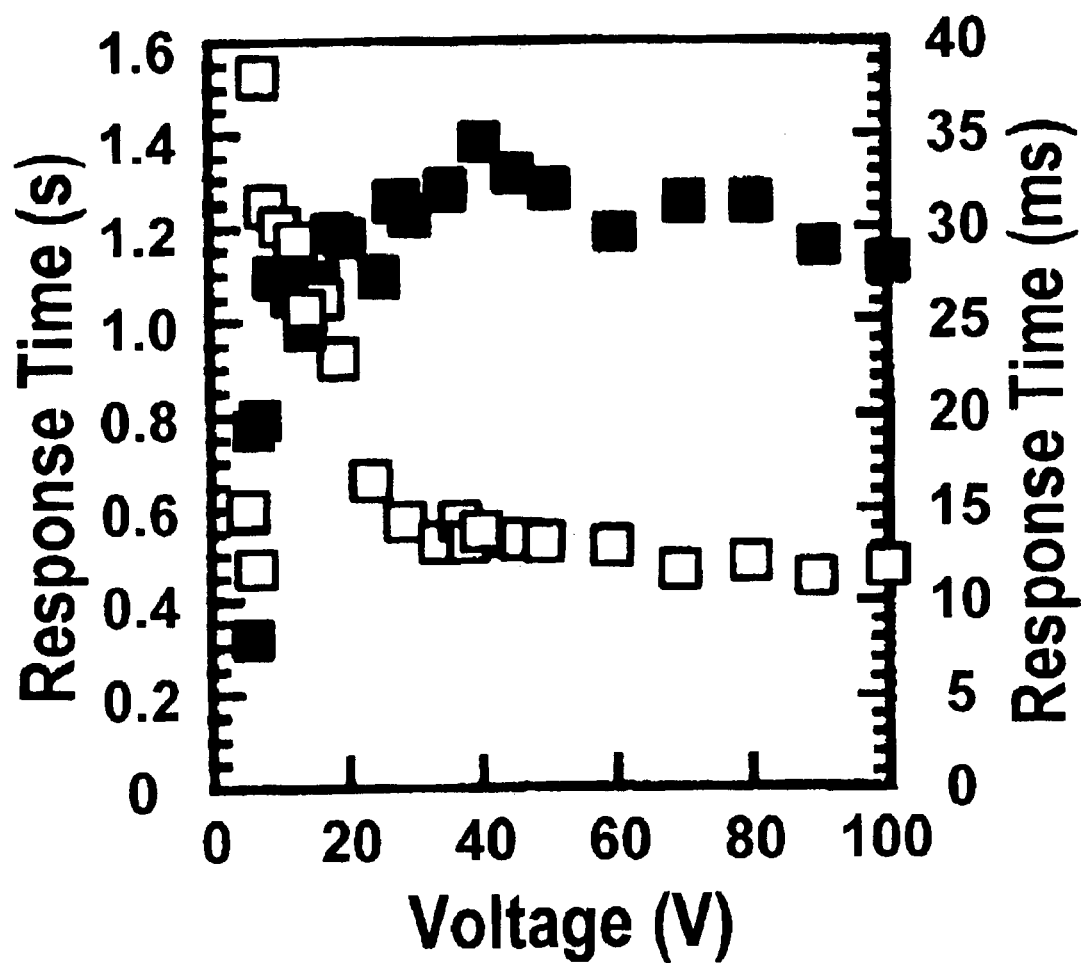
FIG. 20 shows a relationship between the response time and the voltage of the second electric signal in case of the use of comb-shaped electrode 11a alone.

FIG. 20 shows a relationship between the response time and the voltage of the second electric signal in case of the use of comb-shaped electrode 11a alone. The response time in FIG. 20 is defined as a period from 100 to 10% of the reflected-light intensity through liquid crystal 9, without rubbing treatment (□), or with rubbing treatment (■), after the drop of the second electric signal. In addition, the response time in case of no rubbing treatment (□) is according to the scale on the right side in FIG. 20, and that in case of rubbing treatment (■) is according to the scale on the left side in FIG. 20. It seems that the response time in case of no rubbing treatment (□) is approximately constant at more than 30 V of the second electric signal. In addition, it is clear that the response time in case of no rubbing treatment (□) is much superior to that of rubbing treatment (■).

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A reflective liquid-crystal display comprising:
   a display assembly composed of
      a first transparent nonpiezoelectric-plate having a first transparent electrode under thereof,
      a second transparent nonpiezoelectric-plate having a second transparent electrode over thereof, and
      a liquid crystal between said first- and second transparent electrodes; and
   a piezoelectric assembly composed of
      a piezoelectric substrate,
      at least one electrode under said piezoelectric substrate, and
      a counter electrode over said piezoelectric substrate,
         said display assembly being formed on said piezoelectric assembly,
         said at least one electrode and said counter electrode receiving a first electric signal, exciting a thickness-mode vibration in said piezoelectric substrate, generating an elastic wave in said liquid crystal, and causing said liquid crystal to be in an opaque state,
         said first- and second transparent electrodes receiving a second electric signal, applying electric field to at least a part of said liquid crystal, and causing said at least a part of said liquid crystal to be in a transparent state, and
         said counter electrode reflecting a light through said at least a part of said liquid crystal.

2. A reflective liquid-crystal display as defined in claim 1, wherein said first electric signal has a frequency approximately equal to the resonance frequency of thickness-mode in the combination of said second transparent nonpiezoelectric-plate and said piezoelectric substrate.

3. A reflective liquid-crystal display as defined in claim 1, wherein said piezoelectric substrate is made of a piezoelectric ceramic thin plate, the polarization axis thereof being parallel to the thickness direction thereof.

4. A reflective liquid-crystal display as defined in claim 1, wherein said piezoelectric substrate is made of a piezoelectric polymer film.

5. A reflective liquid-crystal display as defined in claim 1, wherein the phase velocity of the elastic wave traveling in said second transparent nonpiezoelectric-plate alone is lower than that traveling in said piezoelectric substrate alone, and at the same time, higher than that traveling in said liquid crystal alone.

6. A reflective liquid-crystal display as defined in claim 1, wherein the phase velocity of the elastic wave traveling in said first transparent nonpiezoelectric plate alone is higher than that traveling in said liquid crystal alone.

7. A reflective liquid-crystal display as defined in claim 1, wherein said liquid crystal is made of a nematic liquid crystal.

8. A reflective liquid-crystal display as defined in claim 1, wherein said liquid crystal is made of a ferroelectric liquid crystal.

9. A reflective liquid-crystal display as defined in claim 1, wherein said first- and second transparent electrodes are made of indium-tin oxide, respectively.

10. A reflective liquid-crystal display as defined in claim 1, wherein
    said first- and second transparent electrodes comprise a group of slender subelectrodes, forming a stripe pattern, respectively,
    a stripe direction of said first transparent electrode and that of said second transparent electrode are orthogonal from each other,
    at least one of said subelectrodes of said first transparent electrode and that of said second transparent electrode receive said second electric signal, and apply electric field to at least one crossing zone, in said liquid crystal, between said at least one of said subelectrodes of said first transparent electrode and that of said second transparent electrode, and then, cause said at least one crossing zone to be in said transparent state.

11. A reflective liquid-crystal display as defined in claim 1, wherein
    said first transparent electrode comprises a group of dot-subelectrodes, and said second transparent electrode comprises a plate-shaped electrode,
    at least one of said dot-subelectrodes and said plate-shaped electrode receive said second electric signal, and apply electric field to at least one zone, in said liquid crystal, between said at least one of said dot-subelectrodes and said plate-shaped electrode, and then, cause said at least one zone to be in said transparent state.

12. A reflective liquid-crystal display as defined in claim 1, wherein
    said first transparent electrode comprises a plate-shaped electrode, and said second transparent electrode comprises a group of dot-subelectrodes,
    said plate-shaped electrode and at least one of said dot-subelectrodes receive said second electric signal, and apply electric field to at least one zone, in said liquid crystal, between said plate-shaped electrode and said at least one of said dot-subelectrodes, and then, cause said at least one zone to be in said transparent state.

13. A reflective liquid-crystal display as defined in claim 1, wherein said at least one electrode is made of interdigital electrode.

14. A reflective liquid-crystal display as defined in claim 1, wherein said at least one electrode is made of interdigital electrode, of which the interdigital periodicity is larger than the thickness of said piezoelectric substrate.

15. A reflective liquid-crystal display as defined in claim 1, wherein said display assembly further comprises a first transparent polymer-film under said first transparent electrode, and a second transparent polymer-film over said second transparent electrode.

16. A reflective liquid-crystal display as defined in claim 1, wherein said display assembly further comprises a first transparent polymer film under said first transparent electrode and a second transparent polymer-film over said second transparent electrode,
    said liquid crystal being put into a space between said first- and second transparent polymer films with rubbing treatment before said at least one electrode and said counter electrode receive said first electric signal.

17. A reflective liquid-crystal display as defined in claim 1, wherein said display assembly further comprises a metallic thin film as a mirror under said second transparent nonpiezoelectric-plate.

18. A reflective liquid-crystal display as defined in claim 1, wherein said display assembly further comprises a color filter.

19. A reflective liquid-crystal display comprising:
  a display assembly composed of
    a first transparent nonpiezoelectric-plate having a first transparent electrode under thereof,
    a second transparent nonpiezoelectric-plate having a second transparent electrode over thereof, and
    a liquid crystal between said first- and second transparent electrodes; and
  a piezoelectric assembly composed of
    a piezoelectric substrate,
    electrodes $E_i$ (i=1, 2, . . . , n) under said piezoelectric substrate,
    a counter electrode over said piezoelectric substrate, and
    a switch connected with said electrodes $E_i$,
      said display assembly being formed on said piezoelectric assembly,
      said electrodes $E_i$, together with said counter electrode, receiving first electric signals via said switch in turn, exciting thickness-mode vibrations corresponding to said electrodes $E_i$ in said piezoelectric substrate in turn, generating elastic waves in said liquid crystal, and causing said liquid crystal to be in an opaque state,
    said first- and second transparent electrodes receiving a second electric signal, applying electric field to at least a part of said liquid crystal, and causing said at least a part of said liquid crystal to be in a transparent state, and
    said counter electrode reflecting a light through said at least a part of said liquid crystal.

* * * * *